(12) United States Patent
Merlin et al.

(10) Patent No.: US 10,075,873 B2
(45) Date of Patent: Sep. 11, 2018

(54) METHODS AND APPARATUS FOR CHANNEL STATE INFORMATION SOUNDING AND FEEDBACK

(71) Applicant: QUALCOMM Incorporated, San Diego, CA (US)

(72) Inventors: Simone Merlin, San Diego, CA (US); Youhan Kim, San Jose, CA (US); Bin Tian, San Diego, CA (US); George Cherian, San Diego, CA (US); Sameer Vermani, San Diego, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 15/052,808

(22) Filed: Feb. 24, 2016

(65) Prior Publication Data

US 2016/0262050 A1    Sep. 8, 2016

Related U.S. Application Data

(60) Provisional application No. 62/127,186, filed on Mar. 2, 2015.

(51) Int. Cl.
*H04W 4/00* (2018.01)
*G08C 17/00* (2006.01)
(Continued)

(52) U.S. Cl.
CPC ........... *H04W 28/06* (2013.01); *H04L 1/0026* (2013.01); *H04L 1/0027* (2013.01);
(Continued)

(58) Field of Classification Search
CPC . H04W 28/06; H04W 72/0413; H04W 84/12; H04L 5/0057; H04L 5/0048; H04L 1/0026; H04L 5/0053; H04L 1/0027
See application file for complete search history.

(56) References Cited

U.S. PATENT DOCUMENTS

2005/0192748 A1*  9/2005  Andric .................... H04L 45/02
                                                         701/300
2012/0140753 A1   6/2012  Lee et al.
(Continued)

FOREIGN PATENT DOCUMENTS

WO    WO-2007064710 A2    6/2007
WO    WO-2007143472 A2    12/2007

OTHER PUBLICATIONS

International Search Report and Written Opinion—PCT/US2016/019577—ISA/EPO—dated Jun. 8, 2016 (152315WO).
(Continued)

*Primary Examiner* — Kiet Tang
(74) *Attorney, Agent, or Firm* — Knobbe, Martens, Olson & Bear, LLP

(57) ABSTRACT

Methods and apparatus for channel state information sounding and feedback are provided. In an aspects, a first message is transmitted to one or more wireless communication devices requesting channel state information. In accordance with this aspects, the first message comprises a header and a payload, the header comprising a plurality of fields of a first field type which are useable to determine the channel state information, and the payload comprising parameters for estimating the channel state information. In certain aspects, the channel state information parameters are also provided in the header of the first message. In various aspects a second message comprising the channel state information is received from the one or more wireless communication devices. In one aspect, the first message is a physical layer convergence protocol data unit (PPDU), and the first field type is a long training field (LTF).

25 Claims, 10 Drawing Sheets

(51) Int. Cl.
*G05D 1/02* (2006.01)
*H04W 28/06* (2009.01)
*H04L 5/00* (2006.01)
*H04W 72/04* (2009.01)
*H04L 1/00* (2006.01)
*H04W 84/12* (2009.01)

(52) U.S. Cl.
CPC .......... *H04L 5/0048* (2013.01); *H04L 5/0053* (2013.01); *H04L 5/0057* (2013.01); *H04W 72/0413* (2013.01); *H04W 84/12* (2013.01)

(56) References Cited

U.S. PATENT DOCUMENTS

2015/0139051 A1* 5/2015 Gonia ............... H04W 52/0209
370/311

2016/0119047 A1* 4/2016 Lee ...................... H04B 7/0617
370/329

OTHER PUBLICATIONS

Narendar Madhavan (Toshiba): "Reducing Channel Sounding Protocol Overhead for 11ax; 11-15-1097-01-00ax-Reducing-Channel-Sounding-Protocol-Overhead-for-11ax", IEEE Draft; 11-15-1097-01-00AX-Reducing-Channel-Sounding-Protocol-Overhead-for-11AX, IEEE-SA Mentor, Piscataway, NJ USA, vol. 802. 11ax, No. 1, Sep. 15, 2015 (Sep. 15, 2015), pp. 1-16, XP068098331, [retrieved on Sep. 15, 2015].

Qi Y., et al., "New Ranging Packet Structure; 15-05-0498-02-004a-New-Ranging-Packet-Structure", IEEE Draft; 15-05-0498-02-004A-New-Ranging-Packet-Structure, IEEE-SA Mentor, Piscataway, NJ USA, vol. 802.154a, No. 2, Sep. 20, 2005 (Sep. 20, 2005), pp. 1-12, XP017670019, [retrieved on Sep. 20, 2005].

* cited by examiner

METHODS AND APPARATUS FOR CHANNEL STATE INFORMATION SOUNDING AND FEEDBACK

CROSS REFERENCE TO PRIORITY APPLICATION

This application claims priority under 35 U.S.C. § 119(e) to U.S. Provisional Pat. App. 62/127,186 entitled "METHODS AND APPARATUS FOR CHANNEL STATE INFORMATION SOUNDING AND FEEDBACK" filed on Mar. 2, 2015, the disclosure of which is hereby incorporated by reference in its entirety.

BACKGROUND

Field

Certain aspects of the present disclosure generally relate to wireless communications, and more particularly, to methods and apparatus for channel state information sounding and feedback Background In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple user terminals to communicate with a single access point by sharing the channel resources while achieving high data throughputs. With limited communication resources, it is desirable to reduce the amount of traffic passing between the access point and the multiple terminals. For example, when multiple terminals send channel state information feedback to the access point, it is desirable to minimize the amount of traffic to complete the uplink of the channel state information. Thus, there is a need for an improved protocol for uplink of channel state information from multiple terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method of wireless communication. The method comprises transmitting a first message to one or more wireless communication devices, the first message requesting channel state information from the one or more wireless communication devices. The first message comprises a header and a payload. The header of the first message comprises a plurality of fields of a first field type which are useable to determine the channel state information, and the payload of the first message comprises parameters for estimating the channel state information.

Another aspect of the disclosure provides an apparatus for wireless communication. The apparatus comprising a processor configured to generate a first message requesting channel state information from one or more wireless communication devices. The generated first message comprises a header and a payload. The header of the first message comprises a plurality of fields of a first field type which are useable to determine the channel state information, and the payload of the first message comprises parameters for estimating the channel state information. The apparatus further comprises a transmitter configured to transmit the first message to the one or more wireless communication devices.

Another aspect of the disclosure provides an apparatus for wireless communication. The apparatus comprising means for generating a first message requesting channel state information from one or more wireless communication devices. The generated first message comprises a header and a payload. The header of the first message comprises a plurality of fields of a first field type which are useable to determine the channel state information, and the payload of the first message comprises parameters for estimating the channel state information. The apparatus further comprises means for transmitting the first message to the one or more wireless communication devices.

Another aspect of the disclosure provides a non-transitory computer readable medium. The medium comprises instructions that when executed cause a processor to perform a method of wireless communication. The method of wireless communication comprises transmitting a first message to one or more wireless communication devices, the first message requesting channel state information from one or more wireless communication devices. The first message comprises a header and a payload. The header of the first message comprises a plurality of fields of a first field type which are useable to determine the channel state information, and the payload of the first message comprises parameters for estimating the channel state information.

DETAILED DESCRIPTION

Figure 1:
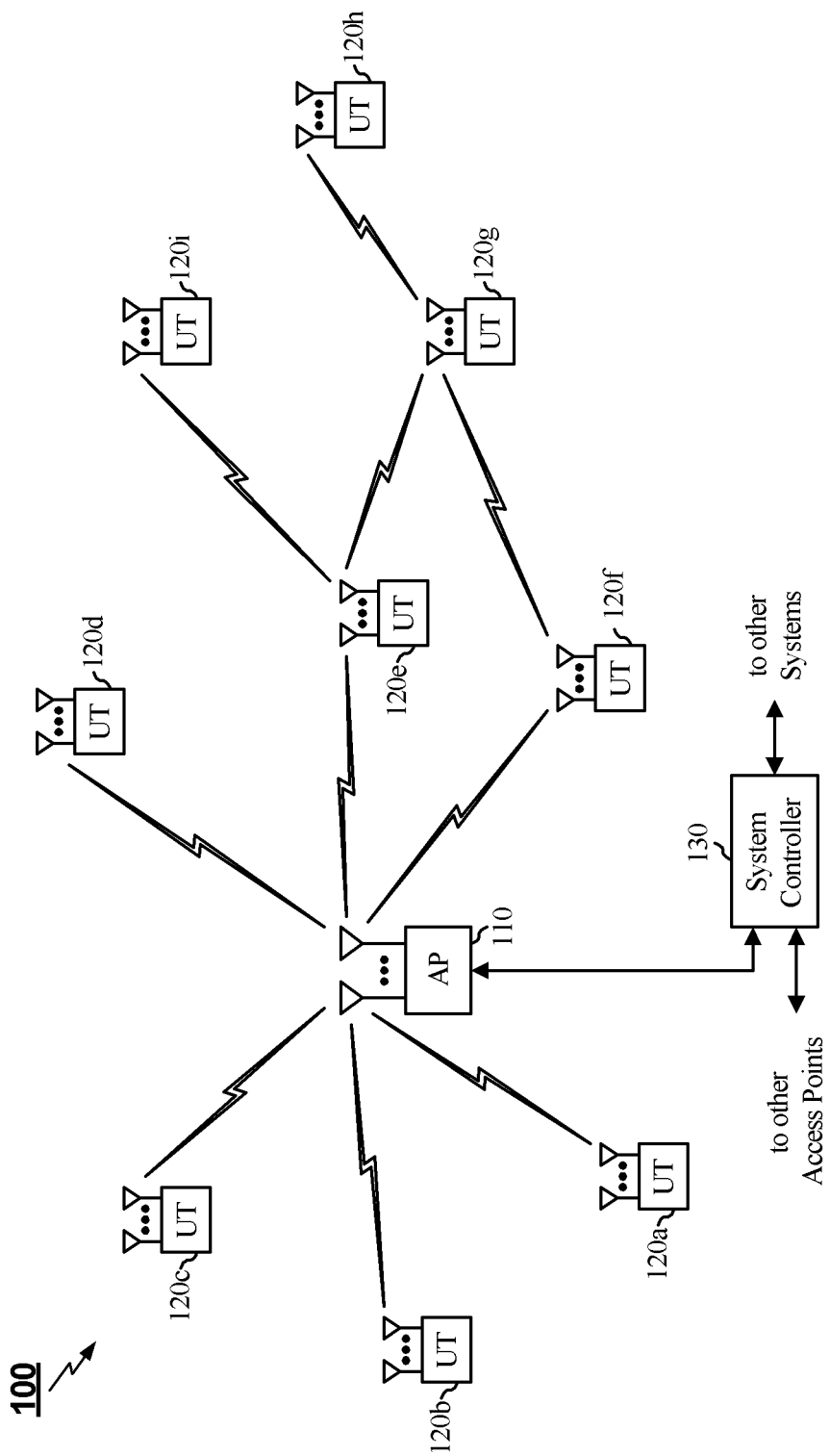
FIG. 1 illustrates a multiple-access multiple-input multiple-output (MIMO) system with access points and wireless communication devices.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, multiple-access multiple-input multiple-output (MIMO), some combination thereof, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points (APs) and clients (also referred to as stations (STAs)). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to concurrently transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point (AP) may comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

A STA may also comprise, be implemented as, or known as a user terminal, an access terminal (AT), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram that illustrates a multiple-access multiple-input multiple-output (MIMO) system 100 with access points and user terminals. For simplicity, only one access point 110 is shown in FIG. 1. An access point is generally a fixed station that communicates with the user terminals, and a user terminal or STA may be fixed or mobile, and may be referred to herein as simply a wireless communication device. The access point 110 may communicate with one or more wireless communication device 120 (illustrated as UTs 120a-i) at any given moment on the downlink (DL) and uplink (UL). The downlink (i.e., forward link) is the communication link from the access point 110 to the wireless communication devices 120, and the uplink (i.e., reverse link) is the communication link from the wireless communication devices 120 to the access point 110. A wireless communication device 120 may also communicate peer-to-peer with another wireless communication device 120. A system controller 130 couples to and provides coordination and control for the access points 110.

While portions of the following disclosure will describe wireless communication device 120 capable of communicating via Spatial Division Multiple Access (SDMA), for certain aspects, the wireless communication devices 120 may also include some wireless communication devices 120 that do not support SDMA. Thus, for such aspects, the AP 110 may be configured to communicate with both SDMA and non-SDMA user terminals. This approach may conveniently allow older versions of wireless communication devices 120 ("legacy" stations) that do not support SDMA to remain deployed in an enterprise, extending their useful lifetime, while allowing newer SDMA wireless communication devices to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected wireless communication devices 120 collectively represents the multiple-output for downlink transmissions and the multiple-input for uplink transmissions. For pure SDMA, it is desired to have $N_{ap} \leq K \leq 1$ if the data symbol streams for the K wireless communication devices are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected wireless communication device may transmit user-specific data to and/or receive user-specific data from the access point. In general, each selected wireless communication device may be equipped with one or multiple antennas (i.e., $N_{ut} \geq 1$). The K selected wireless communication devices can have the same number of antennas, or one or more wireless communication devices may have a different number of antennas.

The system 100 may be a SDMA system according to a time division duplex (TDD) or a frequency division duplex (FDD). For a TDD system, the downlink and uplink share the same frequency band. For an FDD system, the downlink and uplink use different frequency bands. The system 100 may also be a MIMO system utilizing a single carrier or multiple carriers for transmission. Each wireless communication device 120 may be equipped with a single antenna (e.g., in order to keep costs down) or multiple antennas (e.g., where the additional cost can be supported). The system 100 may also be a TDMA system if the wireless communication devices 120 share the same frequency channel by dividing transmission/reception into different time slots, where each time slot may be assigned to a different wireless communication device 120.

Figure 2:
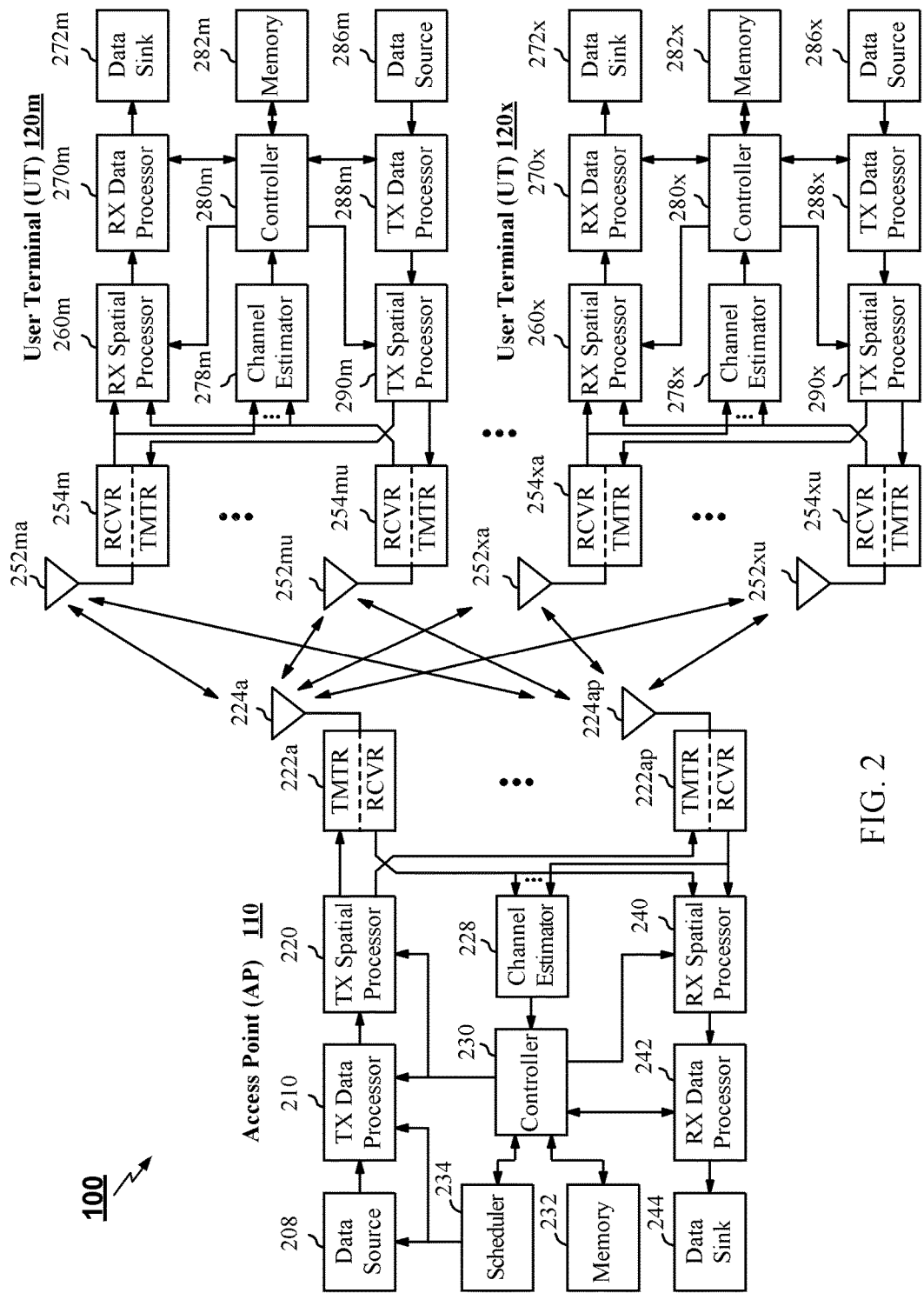
FIG. 2 illustrates a block diagram of the access point and two wireless communication devices in the MIMO system of FIG. 1.

FIG. 2 illustrates a block diagram of the access point 110 and two wireless communication devices (illustrated as user terminal 120m and user terminal 120x) in system 100 (illustrated as a MIMO system). The access point 110 is equipped with $N_t$ antennas 224a and 224ap. The user terminal 120m is equipped with $N_{ut,m}$ antennas $252_{ma}$ and $252_{mu}$, and the user terminal 120x is equipped with $N_{ut,x}$ antennas $252_{xa}$ and $252_{xu}$. The access point 110 is a transmitting entity for the downlink and a receiving entity for the uplink. The wireless communication devices 120 are transmitting entities for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ wireless communication devices 120 are selected for simultaneous transmission on the uplink, and $N_{dn}$ wireless communication devices 120 are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the wireless communication devices 120.

On the uplink, at each wireless communication device 120 selected for uplink transmission, a TX data processor 288 receives traffic data from a data source 286 and control data from a controller 280. The TX data processor 288 processes (e.g., encodes, interleaves, and modulates) the traffic data for the wireless communication device 120 based on the coding and modulation schemes associated with the rate selected for the wireless communication device 120 and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter/receiver units 254 provide $N_{ut,m}$ uplink signals for transmission from $N_{ut,m}$ antennas 252, for example to transmit to the access point 110.

$N_{up}$ wireless communication devices 120 may be scheduled for simultaneous transmission on the uplink. Each of these wireless communication devices 120 may perform spatial processing on its respective data symbol stream and transmit its respective set of transmit symbol streams on the uplink to the access point 110.

At the access point 110, $N_{up}$ antennas 224a through $224_{ap}$ receive the uplink signals from all $N_{up}$ wireless communication device 120 transmitting on the uplink. Each antenna 224 provides a received signal to a respective receiver unit (RCVR) 222. Each transmitter/receiver unit 222 performs processing complementary to that performed by transmitter/receiver unit 254 and provides a received symbol stream. An RX spatial processor 240 performs receiver spatial processing on the $N_{up}$ received symbol streams from $N_{up}$ transmitter/receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each wireless communication device 120 may be provided to a data sink 244 for storage and/or a controller 230 for further processing.

On the downlink, at the access point 110, a TX data processor 210 receives traffic data from a data source 208 for $N_{dn}$ wireless communication devices 120 scheduled for downlink transmission, control data from a controller 230, and possibly other data from a scheduler 234. The various types of data may be sent on different transport channels. TX data processor 210 processes (e.g., encodes, interleaves, and modulates) the traffic data for each wireless communication device 120 based on the rate selected for that wireless communication device 120. The TX data processor 210 provides $N_{dn}$ downlink data symbol streams for the $N_{dn}$ wireless communication devices 120. A TX spatial processor 220 performs spatial processing (such as a precoding or beamforming) on the $N_{dn}$ downlink data symbol streams, and provides $N_{up}$ transmit symbol streams for the $N_{up}$ antennas. Each transmitter/receiver unit 222 receives and processes a respective transmit symbol stream to generate a downlink signal. $N_{up}$ transmitter/receiver units 222 may provide $N_{up}$ downlink signals for transmission from $N_{up}$ antennas 224, for example to transmit to the wireless communication devices 120.

At each wireless communication device 120, $N_{ut,m}$ antennas 252 receive the $N_{up}$ downlink signals from the access point 110. Each transmitter/receiver unit 254 processes a received signal from an associated antenna 252 and provides a received symbol stream. An RX spatial processor 260 performs receiver spatial processing on $N_{ut,m}$ received symbol streams from $N_{ut,m}$ transmitter/receiver units 254 and provides a recovered downlink data symbol stream for the wireless communication device 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the wireless communication device 120.

At each wireless communication device 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the wireless communication device 120 based on the downlink channel response matrix $H_{dn,m}$ for that wireless communication device 120. Controller 230 derives the spatial filter matrix for the access point 110 based on the effective uplink channel response matrix $H_{up,eff}$. The controller 280 for each wireless communication device 120 may send feedback information (e.g., the downlink and/or uplink eigenvectors, eigenvalues, SNR estimates, and so on) to the access point 110. The controllers 230 and 280 may also control the operation of various processing units at the access point 110 and wireless communication devices 120, respectively.

Figure 3:
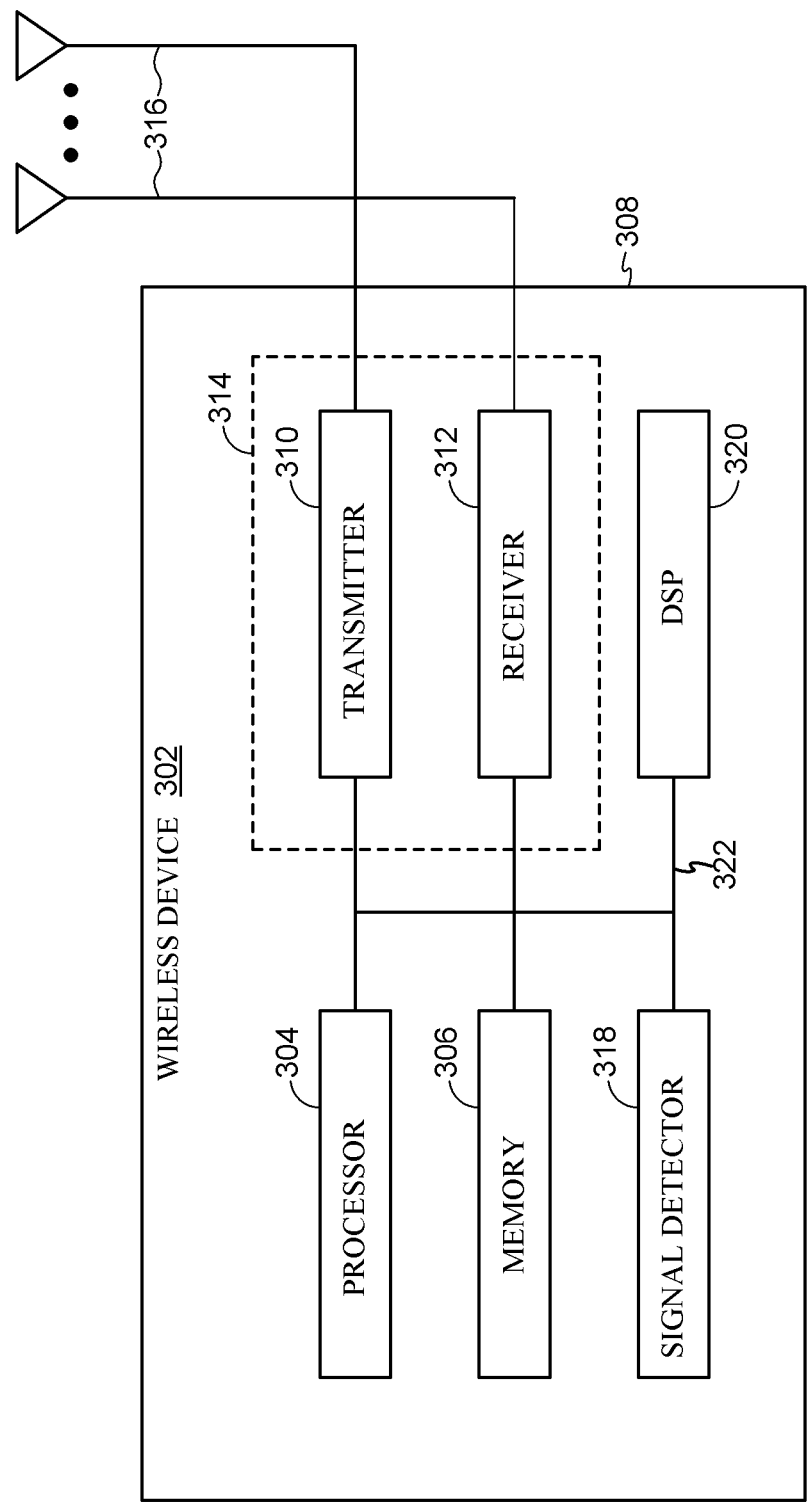
FIG. 3 illustrates various components that may be utilized in a wireless device that may be employed within a wireless communication system.

FIG. 3 illustrates various components that may be utilized in a wireless communication device 302 that may be employed within the wireless communication system 100. The wireless communication device 302 is an example of a device that may be configured to implement the various methods described herein. The wireless communication device 302 may implement an access point 110 or a wireless communication device 120.

The wireless communication device 302 may include a processor 304 which controls operation of the wireless communication device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless communication device 302 may also include a housing 308 that may include a transmitter 310 and a receiver 312 to allow transmission and reception of data between the wireless communication device 302 and a remote location. The transmitter 310 and receiver 312 may be combined into a transceiver 314. A single or a plurality of transceiver antennas 316 may be attached to the housing 308 and electrically coupled to the transceiver 314. The wireless communication device 302 may also include (not shown) multiple transmitters, multiple receivers, and multiple transceivers.

The wireless communication device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless communication device 302 may also include a digital signal processor (DSP) 320 for use in processing signals.

The various components of the wireless communication device 302 may be coupled together by a bus system 322, which may include a power bus, a control signal bus, and a status signal bus in addition to a data bus.

Figure 4:
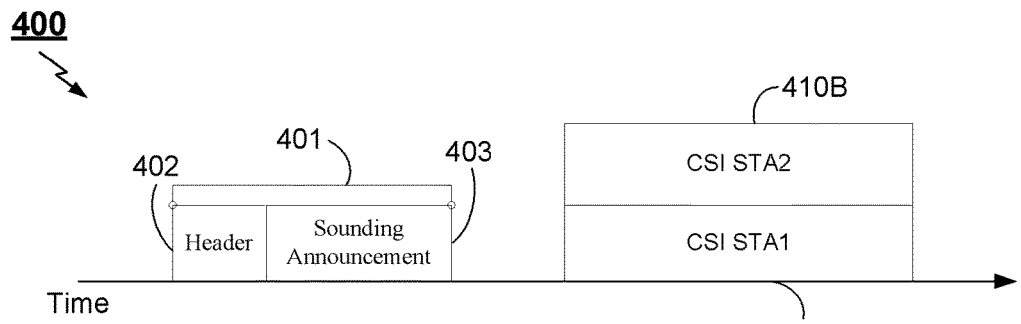
FIG. 4 shows a time diagram of an example frame exchange of channel state information (CSI) feedback.
Figure 5:
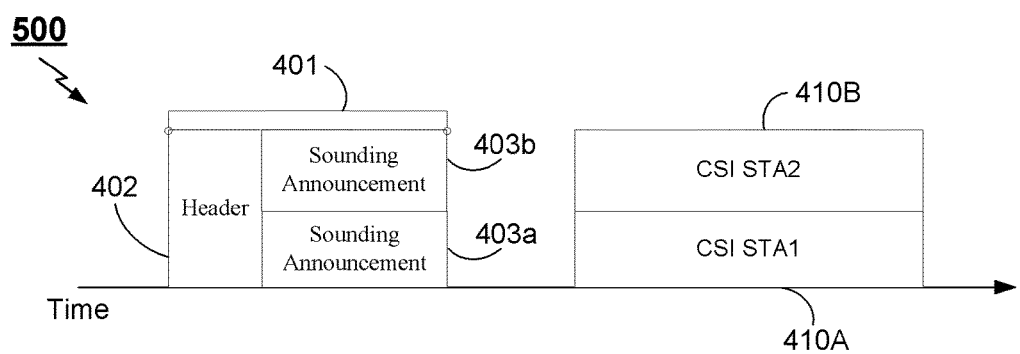
FIG. 5 shows a time diagram of another example frame exchange of CSI feedback.
Figure 6:
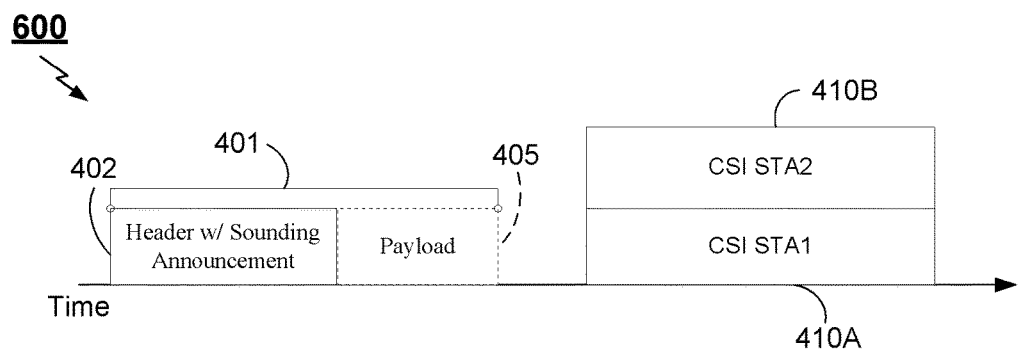
FIG. 6 shows a time diagram of another example frame exchange of CSI feedback.

Certain aspects of the present disclosure support transmitting uplink (UL) channel state information (CSI) from multiple STAs to an AP. In some embodiments, the UL CSI may be transmitted in a multi-user MIMO (MU-MIMO) system. Alternatively, the UL CSI may be transmitted in a multi-user FDMA (MU-FDMA), multi-user OFDMA (MU-OFDMA) or similar FDMA system. Specifically, FIGS. 4-6 illustrate UL-MU-MIMO CSI transmissions 410A and 410B that would apply equally to UL-FDMA, UL-OFDMA, or similar UL FDMA system transmissions. In these embodiments, UL-MU-MIMO, UL-OFDMA, or similar UL FDMA system transmissions can be sent simultaneously from multiple STAs to an AP and may create efficiencies in wireless communication.

The sounding procedure described herein may comprise at least an "announcement frame" (or "null data packet announcement (NDPA) frame") and a "CSI frame," and may additionally or alternatively comprise a "null data packet (NDP) frame," a "trigger frame" (or "clear to transmit (CTX) frame"), and a "report poll frame." In the context of 802.11 specifications, the "frame" may be identified as a physical layer convergence protocol data unit (PPDU), a medium access control protocol data unit (MPDU), or some portion thereof (e.g., a header or preamble of a PPDU or MPDU). The announcement frame(s) may convey at least sounding announcement information which instructs the STAs on whether/how to compute the CSI, and UL-SU or UL-MU resource allocation information which instructs the STAs on how to send the CSI by using UL-MU-MIMO or UL-OFDMA.

The sounding announcement may comprise a PPDU carrying sounding announcement information in the medium access control (MAC) payload or in its physical layer (PHY) header. The sounding announcement information may comprise identifiers of the STAs that are to report the CSI, and may comprise additional parameters of information useable for the computation and transmissions of the CSI. The header of the PPDU carrying the sounding announcement information (or a sounding NDP in some embodiments) may provide a reference signal that allows STAs to estimate the channel between the one or more antennas of the transmitter and the one or more antennas of the STA. The header may be and may be an 802.11ax header frame, an 802.11ac header frame, an 802.11n header frame, an 802.11ah header frame, or other 802.11 based header frame. In some aspects, the header may comprise a plurality of long-training fields (LTFs), and may be referred to herein as a "staggered sounding" procedure.

In some embodiments, CSI may comprise known channel properties of a communication link. In some aspects the CSI may describe how a signal propagates and represents the combined effect of, for example, scattering, fading, and power decay with distance. For example, for MU-MIMO transmissions, the CSI may comprise one or more of a beamforming matrix, received signal strength, and other information that allows weighting of antennas to mitigate interference in the spatial domain.

FIG. 4 is a time sequence diagram illustrating an example of a frame exchange 400 of channel state information (CSI) feedback between an AP 110 and a wireless communication device 120 (e.g., wireless communication device 120a of FIG. 1, illustrated as STA1 in FIG. 4) in a single user (SU) environment. As shown in FIG. 4, and in conjunction with FIG. 1, an AP 110 may transmit frame 401 to a wireless communication device 120 comprising a header 402 and a payload (comprising sounding announcement 403, as shown in FIG. 4). The header 402 may indicate the presence and the quantity of sounding fields present in the header 402. In one embodiment, a bit or number of bits in the header 402 may be used for this purpose. In some aspects, these bits may be present in a high-efficiency (HE) SIG-A or HE-SIG-B field of a PPDU. In one embodiment, the sounding fields present in the header 402 may be HE-LTFs. Additional HE-LTFs may be added for the purpose of sounding. In accordance with this embodiment, only HE wireless communication devices may be able to decode or utilize the HE-LTFs. This procedure may be referred to as staggered sounding. In various aspects, the header 402 may be transmitted in accordance with a format similar to the frame 900 discussed herein with respect to FIG. 9.

The sounding announcement 403 may identify the recipients of the sounding announcement 403, and may further identify the corresponding parameters for transmission of CSI (e.g., for CSI transmission 410A). For instance, in one embodiment, the sounding announcement may instruct the wireless communication device 120 to use legacy (e.g., 802.11ac), UL-MU-MIMO, UL-OFDMA, or a combination thereof in their transmission of the requested CSI. In an exemplary embodiment, sounding announcement 403 is an NDPA contained in a PPDU. In accordance with this embodiment, frame 401 may be considered the PPDU. In some aspects, the sounding announcement 403 may be contained in the payload or MAC frame of the PPDU. In other aspects, the sounding announcement 403 may be contained within the header portion of the PPDU (e.g., header 402). In some embodiments, the sounding announcement 403 may instruct the recipient wireless communication device 120 to respond simultaneously after the sounding announcement 403. In various aspects, the wireless communication device 120 may be instructed to respond a short interframe space (SIFS) time period after receiving the sounding announcement 403. The sounding announcement 403 may be transmitted in accordance with a format similar to the frames 700 or 701 discussed herein with respect to FIG. 7A or 7B.

In one embodiment, the sounding announcement 403 may be the only frame contained in the payload of frame 401. In other embodiments, the payload of frame 401 may comprise additional fields in the payload. In one exemplary embodiment, the payload of frame 401 may host an aggregated MPDU (A-MPDU) wherein one of the MPDUs is the sounding announcement 403. In accordance with this embodiment, an indication in the header 402 may prompt all stations of a certain set of capabilities to decode the entire A-MPDU, at least until the sounding announcement 403 is found. The sounding announcement 403 may be an NDPA in this embodiment. In other embodiments, the payload of frame 401 may comprise a variety of information, such as data or management information intended for the wireless communication device 120. In accordance with this embodiment, the recipient wireless communication device 120 may be the only device sounded and the only device from which CSI is requested. Accordingly, in some aspects, the parameters for the requested CSI may be included in a HE control field of an MPDU. In one embodiment, the MPDU discussed above may be transmitted in accordance with a format similar to the frame 800 discussed herein with respect to FIG. 8A.

In response to the frame 401 or sounding announcement 403, the wireless communication device 120 may transmit CSI to the AP 110. Specifically, the wireless communication device 120 identified by the sounding announcement 403 may estimate the channel based on the information contained in the header 402 and send a representation of the estimated channel in a sounding feedback CSI transmission. In FIG. 4, STA1 transmits CSI transmission 410A to the AP 110. The CSI transmission 410A may be a legacy transmission, UL-MU-MIMO transmission, UL-OFDMA transmission, or some combination thereof. Upon receiving the CSI transmission 410A, the AP 110 may accurately determine information about the channel from the AP 110 to the wireless communication device 120 (e.g., STA1). In various aspects, the time in between the frame 401 and the CSI transmission 410A may be a SIFS (or point interframe space (PIFS)) time period. Minor alterations may be made to frame exchange 400 in order to enable a multi-user frame exchange.

FIG. 5 is a time sequence diagram illustrating an example of a frame exchange 500 of CSI feedback between an AP 110 and multiple wireless communication devices 120 (e.g., wireless communication devices 120a and 120b of FIG. 1, illustrated as STA1 and STA2 in FIG. 5). Frame exchange 500 may be similar to frame exchange 400 of FIG. 4, but may use an MU-MIMO or OFDMA protocol to determine and communicate CSI with multiple wireless communication devices 120. As shown in FIG. 5, and in conjunction with FIG. 1, an AP 110 may transmit frame 401 to wireless communication devices 120 comprising a header 402 and a payload (comprising sounding announcements 403a and 403b, as shown in FIG. 5). The header 402 may indicate the presence and the quantity of sounding fields present in the header 402 as described above. In some aspects, the number of sounding fields present in the header 402 may be the same or different for each wireless communication device 120. In various aspects, the header 402 may be transmitted in accordance with a format similar to the frame 900 discussed herein with respect to FIG. 9.

The sounding announcements 403a and 403b may identify the recipients thereof, and may further identify the corresponding parameters for transmission of CSI (e.g., for CSI transmissions 410A and 410B). For instance, in one embodiment, the sounding announcement may instruct the wireless communication devices 120 to use UL-MU-MIMO, UL-OFDMA, or a combination thereof in their transmission of the requested CSI, and may further indicate the corresponding transmission parameters, such as transmission sub-channel or stream. In an exemplary embodiment, sounding announcements 403a and 403b are NDPAs contained in a PPDU. In accordance with this embodiment, frame 401 may be considered the PPDU. In some aspects, the sounding announcements 403a and 403b may be transmitted on the tone or sub-band allocated to each wireless communication device 120. In accordance with this embodiment, the header 402 may comprise an indication of which resource of the frame 401 each wireless communication devices 120 should decode. In one embodiment, this indication is a list of wireless communication devices 120 paired with an indication of a tone or sub-band on which to decode. Other aspects of the sounding announcements 403a and 403b may be implemented similar to sounding announcement 403 described above. The sounding announcements 403a and 403b may be transmitted in accordance with a format similar to the frame 700 or 701 discussed herein with respect to FIG. 7A or 7B.

In one embodiment, the sounding announcements 403a and 403b may be the only frames contained in the payload of frame 401 transmitted on the respective tone or sub-band. In other embodiments, the payload of frame 401 may comprise additional fields in the payload as described above. In one exemplary embodiment, the payload of frame 401 may host an aggregated MPDU (A-MPDU) wherein one of the MPDUs is the sounding announcement 403. In some aspects, one of the MPDUs may be a trigger frame. In various aspects, the trigger frame may indicate which wireless communication devices 120 are to participate in the frame exchange 500, such that a particular wireless communication device 120 knows to start a transmission (e.g., transmission 410A or 410B). In some aspects, the trigger frame may provide an indication of a resource allocation to the wireless communication devices 120 for the transmission of the CSI requested by the AP 110. In some embodiments, the indication of the resource allocation is an indication of a spatial stream or frequency bandwidth allocated to the wireless communication device 120, which may be a specific tone or sub-band allocation. The sounding announcements 403a and 403b may be aggregated with the trigger frame. For example, the sounding announcements 403a and 403b, and the trigger frame may each be transmitted within a payload of the same PPDU transmission (e.g., frame 401). In another example, the trigger frame is sent after the sounding announcements 403a and 403b without any time between the transmissions. In other embodiments, the trigger frame may be sent separately from the sounding announcements 403a and 403b, and may be sent a SIFS time period after the transmission of frame 401. In one embodiment, the trigger frame may be transmitted in accordance with a format similar to the CTX frame 801 discussed herein with respect to FIG. 8B.

In some embodiments, an indication in the header 402 may prompt all stations of a certain set of capabilities to decode the entire A-MPDU, at least until the sounding announcement 403 and/or the trigger message are found. The sounding announcement 403 may be an NDPA in this embodiment. In other embodiments, the payload of frame 401 may comprise a variety of information, such as data or management information intended for a wireless communication device 120. In accordance with this embodiment, the recipient wireless communication device 120 may be the only device sounded and the only device from which CSI is requested. Accordingly, in some aspects, the parameters for the requested CSI may be included in a HE control field of the PPDU.

The wireless communication devices 120 identified by the sounding announcements 403a and 403b may estimate the channel based on the sounding information in the header 402 and send a representation of the estimated channel in a sounding feedback CSI transmission. In FIG. 5, STA1 and STA2 concurrently transmit CSI transmissions 410A and 410B to the AP 110. The CSI transmissions 410A and 410B may be UL-MU-MIMO transmissions, UL-OFDMA transmissions, or some combination thereof. In some embodiments, the concurrent transmissions may occur at the same time or within a certain threshold time period. These concurrent transmissions may utilize the resource allocation provided in the trigger frame. Upon receiving the CSI transmissions 410A and 410B, the AP 110 may accurately determine information about the channel from the AP 110 to each of the wireless communication devices 120 (e.g., STA1 and STA2).

FIG. 6 is a time sequence diagram illustrating an example of a frame exchange 600 of CSI feedback between an AP 110 and multiple wireless communication devices 120 (e.g., wireless communication devices 120a and 120b of FIG. 1, illustrated as STA1 and STA2 in FIG. 6). Frame exchange 600 may be similar to frame exchange 400 or 500 of FIG. 4 and FIG. 5 respectively, but may use an alternative header to transmit requests for CSI with multiple wireless communication devices 120. As shown in FIG. 6, and in conjunction with FIG. 1, an AP 110 may transmit frame 401 to wireless communication devices 120 comprising a header 402 (comprising sounding announcement(s), as shown in FIG. 5) and a payload 405. Similar to above, the header 402 may indicate the presence and the quantity of sounding fields present in the header 402, buy may further identify the recipients thereof, and may further identify the corresponding parameters for transmission of CSI (e.g., for CSI transmissions 410A and 410B), similar to the sounding announcements 403, 403a, and 403b described above. Header 402 may thereby contain some or all of the information described above with respect to sounding announcements 403, 403a, and 403b. In various aspects, the information previously contained in sounding announcements 403, 403a, and 403b (e.g., CSI parameters) may instead be contained in an HE-SIG-A, an HE-SIG-B, or an HE-SIG-C field of the header 402. In various aspects, the header 402 may be transmitted in accordance with a format similar to the frame 900 discussed herein with respect to FIG. 9. In some aspects, frame 401 may be an NDP. In some aspect, frame 401 is a PPDU.

Payload 405 may be present (i.e., transmitted) in some embodiments, and may not be present in others. Accordingly, frame 401 may be transmitted as just header 402. In some embodiments, payload 405 is transmitted as part of frame 401, but does not contain any information necessary for the sounding procedures described herein.

In various aspects, a trigger frame may indicate which wireless communication devices 120 are to participate in the frame exchange 600, such that a particular wireless communication device 120 knows to start a transmission (e.g., transmission 410A or 410B). In some aspects, the trigger frame may provide an indication of a resource allocation to the wireless communication devices 120 for the transmission of the CSI requested by the AP 110. In some embodiments, the indication of the resource allocation is an indication of a spatial stream or frequency bandwidth allocated to the wireless communication device 120, which may be a specific tone or sub-band allocation. In one embodiment, the trigger frame is contained in payload 405. In other embodiments, the information contained in the trigger frame is sent in HE-SIG-A, an HE-SIG-B, or an HE-SIG-C field of the header 402. In other embodiments, the trigger frame may be sent separately, and may be sent a SIFS time period after the transmission of frame 401. In one embodiment, the trigger frame may be transmitted in accordance with a format similar to the CTX frame 801 discussed herein with respect to FIG. 8B.

In some aspects, the AP 110 may utilize frame 401 in order to request CSI for a tone or sub-band of the spatial stream or frequency bandwidth from each wireless communication device 120. For example, header 402 or sounding announcements 403, 403a, and 403b may contain an indication of a sub-band for which CSI is requested, per each wireless communication device 120. In one embodiment, the spatial stream or bandwidth allocated to each wireless communication device 120 in a trigger frame may indicate that CSI is requested from the wireless communication device 120 for that spatial stream or bandwidth. Accordingly, the wireless communication devices 120 may respond with the requested CSI for the spatial stream or bandwidth in transmissions 410A and 410B.

In some aspects, the sounding announcements 403, 403a, and 403b (and potentially the trigger frame and/or the header 402) are sent on 20/40/80/160 MHz even though the wireless communication device 120 is only requested CSI for a portion of the bandwidth. The sounding announcement 403, 403a, and 403b may include an indication specifying per each STA for which sub-band (sub-channel) the CSI is requested. In other aspects, the sounding announcement 403, 403a, and 403b may be sent to each of the wireless communication devices 120 on a sub-band per each wireless communication device 120 or group of wireless communication devices 120 that are allocated to that sub-band. In accordance with this embodiment, the reception of a sounding announcement 403, 403a, and 403b on a certain sub-channel may implicitly indicate that the STA is supposed to report CSI for that sub-channel. In another embodiment, the sounding announcement may indicate a different sub-channel. The sounding announcements 403, 403a, and 403b may be contained in a MAC frame of the PPDU (e.g., frame 401), or may contain an indication in the header 402 of the PPDU. Each wireless communication device 120 may compute the CSI for the sub-band on which the sounding announcement 403, 403a, and 403b was received. In accordance with this embodiment, sounding announcement 403, 403a, and 403b may be sent on 20/40/80/160 MHz. Thereafter, the wireless communication devices 120 may reply with the CSI in transmissions 410A and 410B. In one embodiment, the DL bandwidth and UL bandwidth may be the same. The above described embodiments may also be combined. For example, a different sounding announcement 403, 403a, and 403b may be sent on each 20 mHz sub-band, and may also indicate a sub-band for the CSI, per each wireless communication device 120.

All of the embodiments described above with respect to FIGS. 4-6, may be slightly altered so that the frame exchanges described in the figures may be scheduled to start at negotiated times for one or more of the wireless communication devices 120. In these altered frame exchanges, a sounding announcement (e.g., 403, 403a, and 403b) may not be required, as all of the CSI parameters may be negotiated beforehand. Accordingly, the AP 110 may negotiate a sounding procedure with the one or more of the wireless communication devices 120 by indicating a time at which the sounding fields (e.g., sounding fields within header 402) will be sent. In one embodiment, the header 402 includes an identifier for the AP 110. In negotiating the sounding procedure, the AP 110 may also indicate the type of feedback or CSI requested, and may indicate a time at which multi-user beamforming report (MU BR) polls may be sent by the AP 110.

In this scheduled periodic sounding, the one or more of the wireless communication devices 120 may wake up at the indicated time to receive the sounding fields (e.g., sounding fields within header 402) and estimate the channel from based thereupon. In one embodiment, the wireless communication devices 120 may wait for an MU BR poll from the AP 110, which the AP 110 may send immediately after the frame 401 or header 402, or at a scheduled time. In another embodiment, the wireless communication devices 120 may be allowed to contend for sending single user CSI. In some embodiments, the BR poll may also indicate the type of feedback requested.

In some aspects, the sounding announcement 403 (as shown in FIGS. 4 and 5) may be an NDPA carried in the payload of a 1× or 4×PPDU. The PPDU may be a single-user (SU) PPDU or MU (MIMO or OFDMA) PPDU and may include one or more MAC protocol data units (MPDUs), at least one of which is an NDPA MAC frame. In this embodiment, the aggregation discussed in relation to FIGS. 4 and 5 may be realized by aggregating the NDPA MAC frame in an aggregated MPDU (A-MPDU) with other MAC frames (e.g., a trigger frame). The NDPA MAC frame provides at least an identification of the STAs that are to estimate and report the CSI, the parameters for the format of the CSI (band, resolution, quantization), and may include parameters for the transmission of the CSI (UL-MU-MIMO/OFDMA resource allocation, MCS etc.).

Figure 7A:
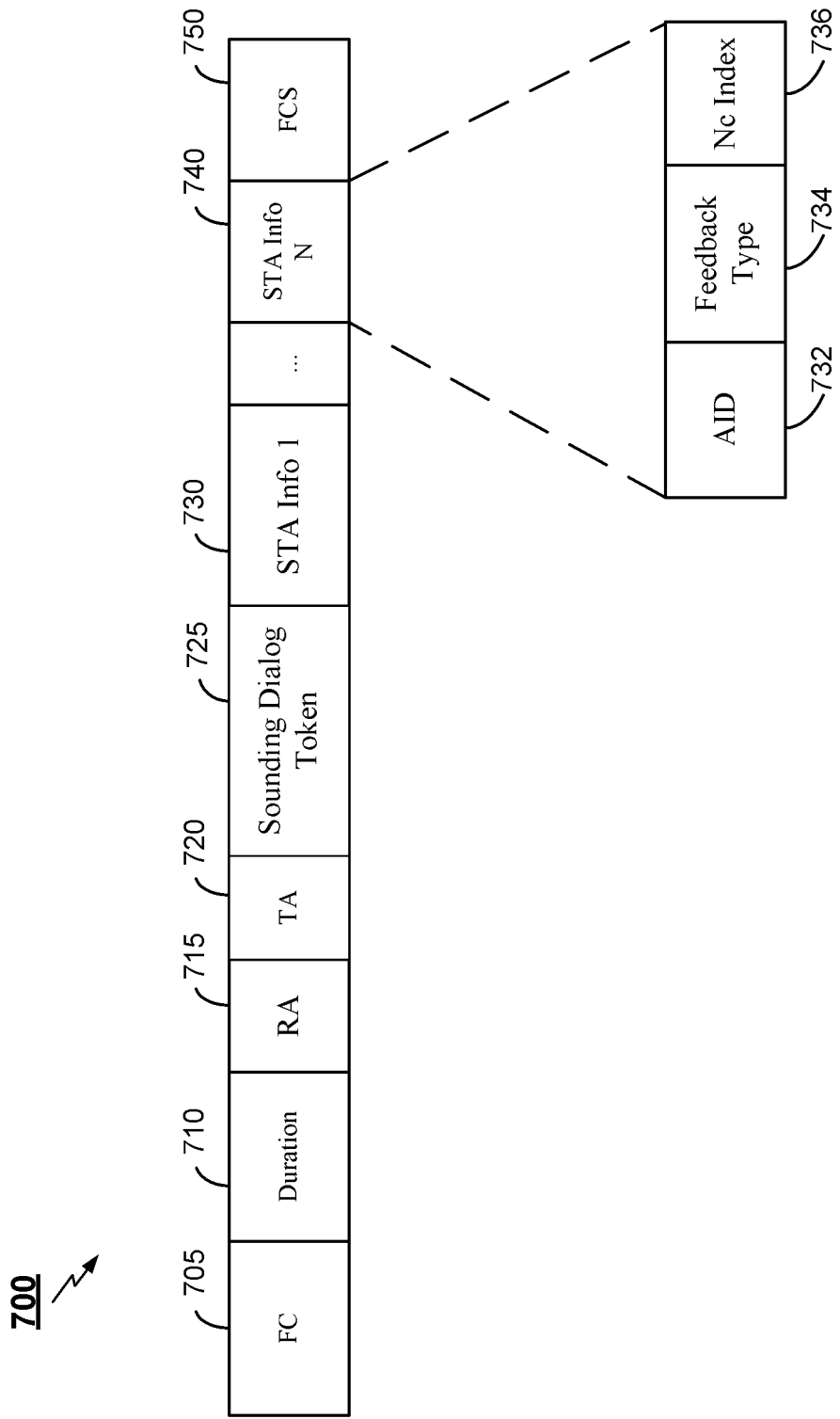
FIG. 7A shows a diagram of one embodiment of a null data packet announcement (NDPA) frame.

FIG. 7A is a diagram of an example format of a MAC NDPA frame 700. In this embodiment, the NDPA frame 700 includes a frame control (FC) field 705, a duration field 710, a receiver address (RA) field 715, a transmitter address (TA) field 720, sounding dialog token field 725, a per STA information (info) field 730, and a frame check sequence (FCS) field 750. The FC field 705 indicates a control subtype or an extension subtype. In the FC field 705, the protocol version, type, and subtype may be the same as defined for the NDP announcement frame defined by the 802.11ac standard. In this case, one or more bits in one of the FC field 705, duration field 710, TA field 720, RA field 715, or sounding dialog token field 725 may be used to indicate that the NDPA frame 700 has a modified format for its use as described in this application. Alternatively, a new type and new subtype may be used to indicate that the NDPA frame 700 has a specific format for the use as described in this application. In some aspects, two reserved bits in the sounding dialog token field 725 may be used to indicate whether the wireless communication devices 120 should send their responses to the NDPA frame 700 via UL-MU-MIMO transmissions, UL-OFDMA transmissions, or according to 802.11ac behavior (i.e. one STA sends CSI immediately and the other STAs wait to be polled).

The duration field 710 indicates to any receiver of the NDPA frame 700 to set the network allocation vector (NAV). The RA field 715 indicates the wireless communication devices 120 (or STAs) that are the intended recipients of the frame. The RA field 715 may be set to broadcast or to a multicast group that includes the STAs listed in the STA info fields 730-740. If the type or subtype are set to a new value, the RA field 715 may be omitted, as the type/subtype implicitly indicates that the destination is broadcast. The TA field 720 indicates the transmitter address or a BSSID. The sounding dialog token field 725 indicates the particular sounding announcement to the STAs. Additionally a field indicating the sub-channel or bandwidth for which the CSI is requested may be added.

In an embodiment where the NDPA frame 700 indicates response should be sent using UL-MU-MIMO, the STAs listed in the STA info fields 730-740 may respond by using UL-MU-MIMO. In this aspect, the stream ordering may follow the same ordering of STA info fields 730-740. Additionally, the number of streams to be allocated and the power offsets for each of the STAs may be pre-negotiated. In another aspect, the number of streams allocated per STA may be based on the number of streams sounded by the sounding NDP. For example, the number of streams per STA may be equal to the number of sounded streams divided by the maximum number of streams available for all STAs listed.

In an embodiment where the NDPA frame 700 indicates response should be sent using UL-OFDMA, the STAs listed in the STA info fields 730-740 may respond by using UL-OFDMA. In this aspect, the channel ordering may follow the same ordering of STA info fields 730-740. Additionally, the number of channels to be allocated and the power offsets for each of the STAs may be pre-negotiated. In another aspect, the number of channels allocated per STA may be based on the number of channels sounded by the sounding NDP.

The STA info field 730 contains information regarding a particular STA and may include a per-STA (per wireless communication device 120) set of information (see STA info 1 730 and STA info N 740). The STA info field 730 may include an allocation identifier (AID) field 732 which identifies a STA, a feedback type field 734, and an Nc index field 736. The FCS field 750 carries an FCS value used for error detection of the NDPA frame 700. In some aspects, the NDPA frame 700 may also include a PPDU duration field (not shown). The PPDU duration field indicates the duration of the following UL-MU-MIMO (or UL-OFDMA) PPDU that the wireless communication devices 120 are allowed to send. In other aspects, the PPDU duration may be agreed to beforehand between an AP 110 and the wireless communication devices 120. In some embodiments, the PPDU duration field may not be included if the duration field 710 is used to compute the duration of the response that the wireless communication devices 120 are allowed to send.

Figure 7B:
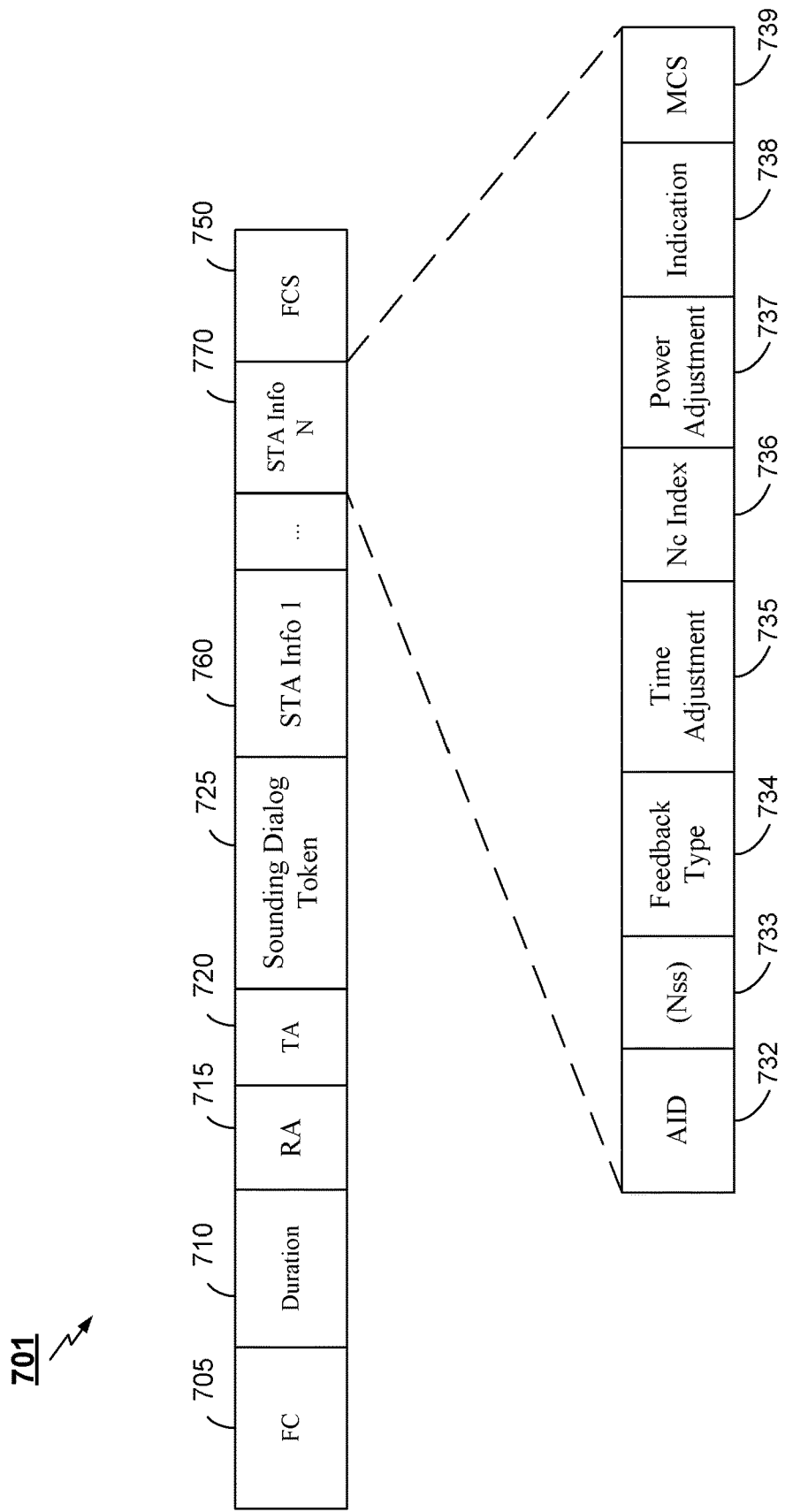
FIG. 7B shows a diagram of another embodiment of an NDPA frame.

In some aspects, a sounding announcement may comprise a modified null data packet announcement (NDPA) frame. FIG. 7B is a diagram of an example format of a modified MAC NDPA frame 701. In this embodiment, the NDPA frame 701 contains the same fields as the NDPA frame 700 except the RA field 715 may be omitted and the STA info fields 730-740 are extended by one or two bytes to include new fields. In this embodiment, STA info fields 760-770 may include a number of spatial streams field (Nss) field 733 which indicates the number of spatial streams a STA may use (in an UL-MU-MIMO system), a time adjustment field 735 which indicates a time that a STA should adjust its transmission compared to the reception of a trigger frame, a power adjustment field 737 which indicates a power backoff a STA should take from a declared transmit power, an indication field 738 which indicates the allowed transmission modes, and a MCS field 739 which indicates the MCS the STA should use or the backoff the STA should use. The STA info field 730 may include a 1 bit indication of whether the STA may respond immediately or wait to be polled later. In another aspect the NDPA frame 700 or 701 may include a field indicating that a certain number of STAs should respond immediately and the remaining STA should wait to be polled later.

In some aspects, the NDPA frame 700 may also include a PPDU duration field (not shown). The PPDU duration field indicates the duration of the following UL-MU-MIMO PPDU that the wireless communication devices 120 are allowed to send. In other aspects, the PPDU duration may be agreed to beforehand between an AP 110 and the wireless communication devices 120. In some embodiments, the PPDU duration field may not be included if the duration field 710 carries a value that allows computation of the duration of the response that the wireless communication devices 120 are allowed to send.

Figure 8A:
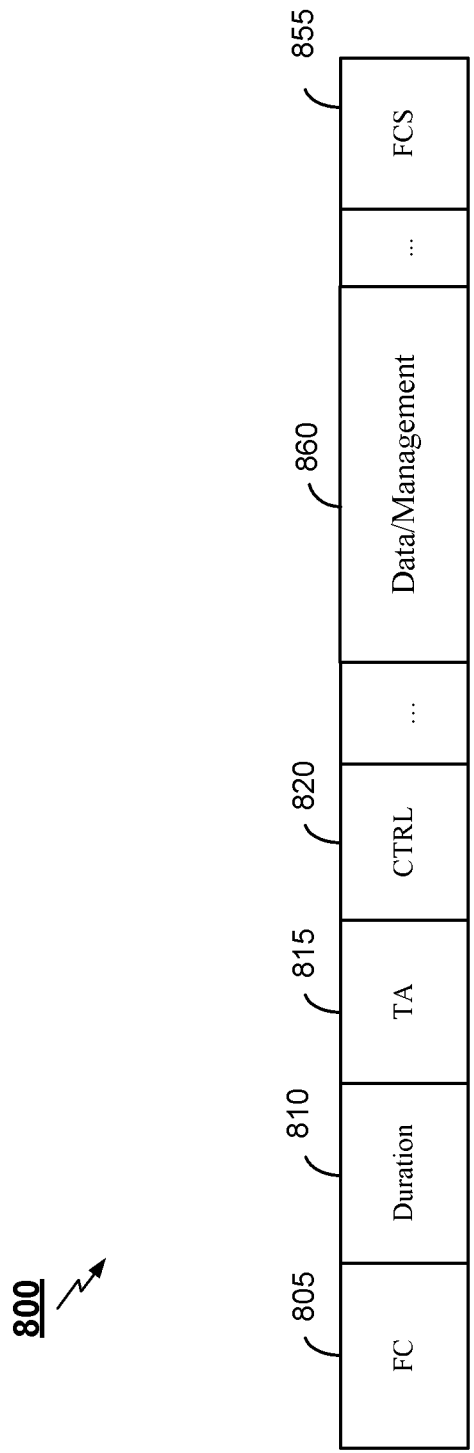
FIG. 8A shows a diagram of one embodiment of a medium access control (MAC) data frame.

FIG. 8A is a diagram of an example format of a MAC frame 800. In this embodiment, the MAC frame 800 includes a FC field 805, a duration field 810, a TA field 815, a MAC control field 820, data or management information field 860, and a FCS field 855. The FC field 805, duration field 810, TA field 815, and FCS field 855 may be implemented similar to the respective fields described herein with respect to FIG. 7A, 7B, or 8B, or some combination thereof. Data or management information field 860 may comprise data or management information intended for the recipient STA of the MAC frame 800. In some embodiments, the described data or management information is intended for a single user, and in other embodiments, the described data or management information is intended for multiple users (e.g., a group of STAs or wireless communication devices 120). In some aspects, control field 820 may comprise an indication of the recipients of MAC frame 800, and in some aspects, control field 820 indicates the parameters for the requested CSI response. Control field 820 may otherwise be implemented similar to control field 820 described below with respect to FIG. 8B.

Figure 8B:
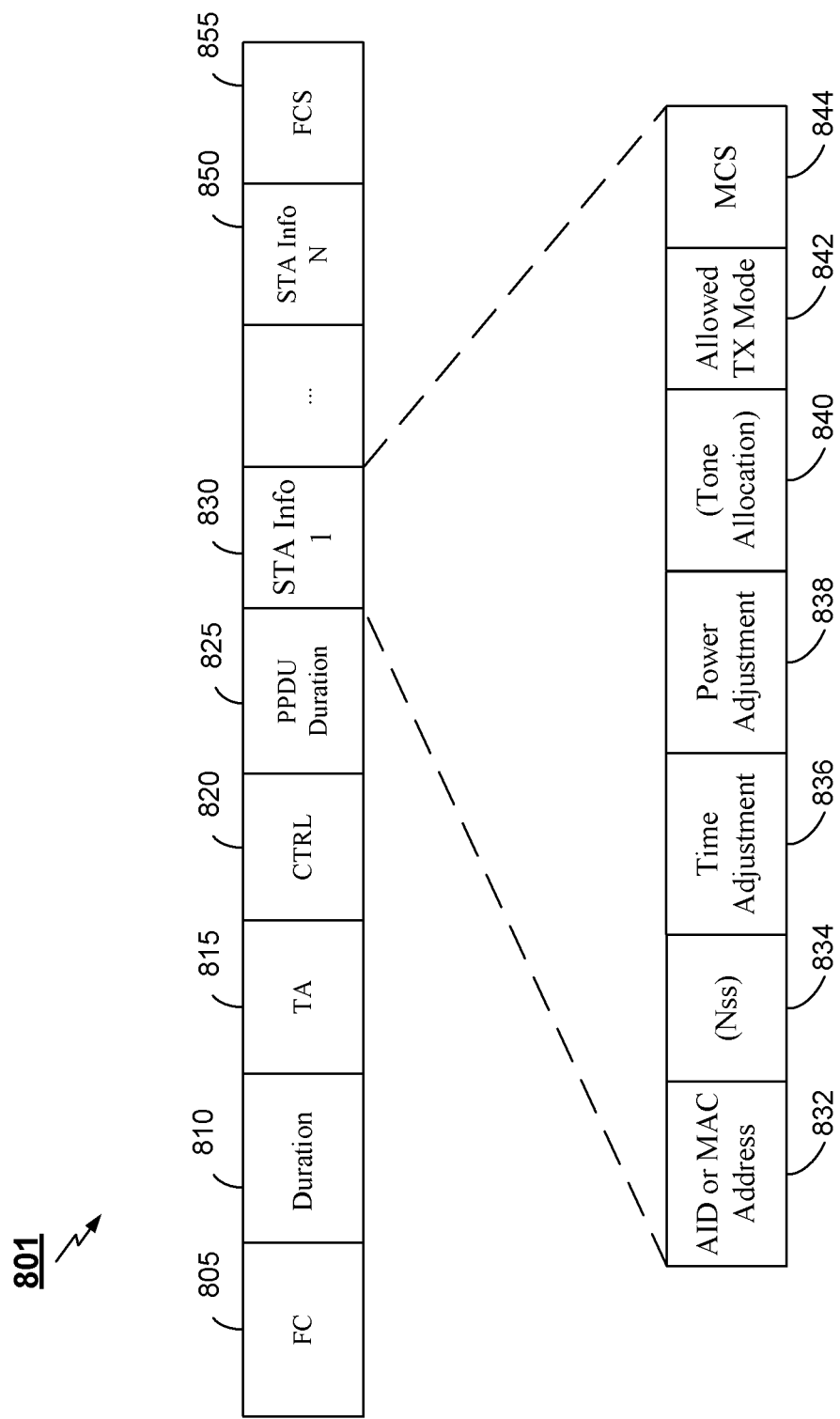
FIG. 8B shows a diagram of one embodiment of a clear to transmit (CTX) frame.

In some aspects, a PPDU comprising the sounding announcement may further comprise a clear to transmit (CTX) frame. FIG. 8B is a diagram of an example format of a CTX frame 801. In some embodiments, the CTX frame 801 may comprise a MAC NDPA frame. In this embodiment, the CTX frame 801 includes a frame control (FC) field 805, a duration field 810, a transmitter address (TA) field 815, a control (CTRL) field 820, a PPDU duration field 825, a STA info field 830, and a frame check sequence (FCS) field 855. The FC field 805 indicates a control subtype or an extension subtype. The duration field 810 indicates to any receiver of the CTX frame 801 to set the network allocation vector (NAV). The TA field 815 indicates the transmitter address or a BSSID. The CTRL field 820 is a generic field that may include information regarding the format of the remaining portion of the frame (e.g., the number of STA info fields and the presence or absence of any subfields within a STA info field), indications for rate adaptation for the wireless communication devices 120 (e.g., a number indicating how the STA should lower their MCSs, compared to the MCS the STA would have used in a single-user (SU) transmission or a number indicating the signal-to-interference-plus-noise ratio (SINR) loss that the STA should account for when computing the MCS in the UL transmission opportunity (TXOP), compared to the MCS computation in the SU transmission), indication of allowed TID, and indication that a CTS must be sent immediately following the CTX frame 801. The CTRL field 820 may also indicate if the CTX frame 801 is being used for UL-MU-MIMO or for UL-OFDMA or both, indicating whether an Nss or tone allocation field is present in the STA Info field 830. Alternatively, the indication of whether the CTX is for UL-MU-MIMO or for UL-OFDMA can be based on the value of the subtype. In some aspects, the UL-MU-MIMO and UL-OFDMA operations can be jointly performed by specifying to a STA both the spatial streams to be used and the channel to be used, in which case both fields are present in the CTX; in this case, the Nss indication is referred to a specific tone allocation. The PPDU duration field 825 indicates the duration of the following UL-MU-MIMO PPDU that the wireless communication devices 120 are allowed to send. The STA info field 830 contains information regarding a particular STA and may include a per-STA (per wireless communication device 120) set of information (see STA Info 1 830 and STA Info N 850). The STA info field 830 may include an AID or MAC address field 832 which identifies a STA, a number of spatial streams field (Nss) 834 field which indicates the number of spatial streams a STA may use (in an UL-MU-MIMO system), a time adjustment field 836 which indicates a time that a STA should adjust its transmission compared to the reception of a trigger frame (the CTX in this case), a power adjustment field 838 which indicates a power backoff a STA should take from a declared transmit power, a tone allocation field 840 which indicates the tones or frequencies a STA may use (in a UL-OFDMA system), an allowed transmission (TX) mode field 842 which indicates the allowed transmission modes, and a MCS 844 field which indicates the MCS the STA should use. The FCS field 855 carries an FCS value used for error detection of the CTX frame 801.

In some embodiments, the PPDU duration field 825 may be omitted from the CTX frame 801 if the duration field 810 carries a value that allows computation of the duration of the response that the wireless communication devices 120 are allowed to send. In other embodiments, the CTX frame 801 may include a sounding sequence number or a token number which STAs may use in their responses to indicate to the AP 110 that its messages are in response to the same CTX frame 801. In some aspects, the STA info field 830 may include a 1 bit indication of whether the STA may respond immediately or wait to be polled later. In some embodiments, the FC field 805 or the CTRL field 820 may indicate that the CTX frame 801 is a sounding announcement CTX frame (i.e. the CTX is followed by a sounding frame (NDP) and requests responses from multiple STAs).

In another embodiment, the sounding announcement portion of a PPDU (e.g., sounding announcement 403) may carry the announcement information in one or more of the SIG field(s) in the PHY header. In one example the PPDU may not carry a MAC payload. In another example the PPDU may include a MAC payload with data, control or management information. In one example, the sounding announcement 403 may be in the MAC portion of an 802.11ax PPDU with a high efficiency (HE) SIG-B field comprising at least an identification of the transmitter AP, an identification of the STAs that are supposed to compute the CSI, identification of the STAs that are supposed to respond with UL-MU-MIMO/OFDMA CSI and the corresponding transmission parameters.

In another example, the sounding announcement is carried only in the PHY header of a PPDU, and comprises the UL resource allocation information, instructing the STA on the transmission parameters for sending the response UL-MU-MIMO/OFDMA PPDU, but does not include sounding announcement information in the PHY header. The sounding announcement information may instead be carried by a NDPA MAC frame in the payload. Hence, the combination of the signaling in the PHY header and in the MAC payload conveys all the necessary signaling for the STAs to compute and report the CSI, in a frame exchange as shown in FIGS. 4-6.

Figure 9:
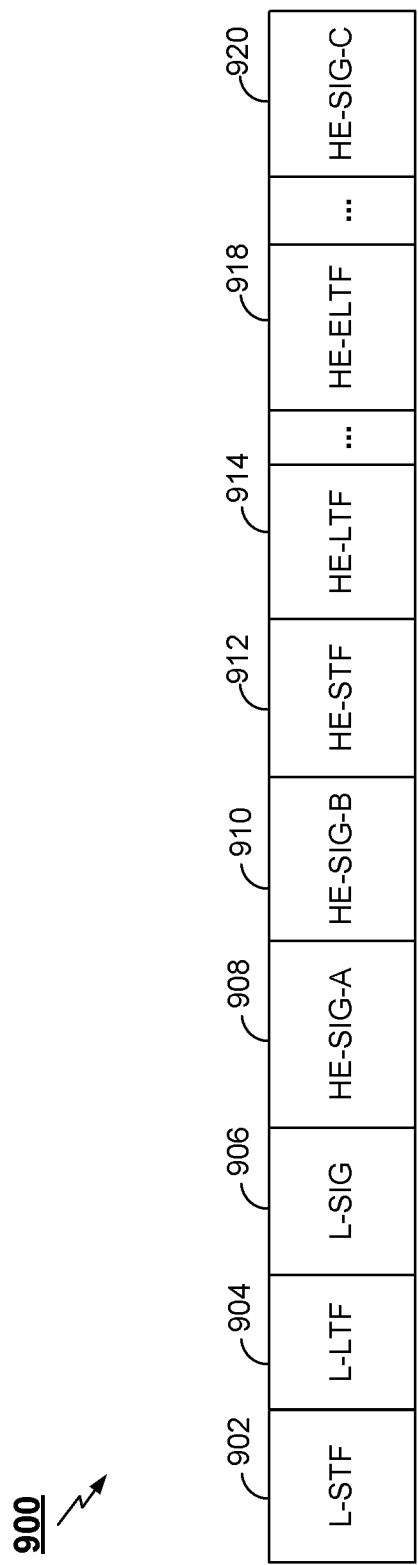
FIG. 9 shows a diagram of one embodiment of a header of a physical layer convergence protocol data unit (PPDU) frame.

In some aspects, the header 402 of frame 401 discussed above with respect to FIGS. 4-6 may comprise a HE header frame of a PPDU. FIG. 9 is a diagram of an example format of a PHY header frame 900. In the illustrated embodiment, the header frame 900 includes an L-STF 902, L-LTF 904, an L-SIG 906, the HE-SIG-A 908, the HE-SIG-B 910, HE-STF 912, HE-LTF 914, HE-ELTF 918, and HE-SIG-C 920. In one exemplary embodiment, the HE-ELTF (extended LTFs) are the fields used for channel estimation by each wireless communication device 120 (STA) reporting the CSI. A person having ordinary skill in the art will appreciate that the illustrated physical-layer header frame 900 can include additional fields, fields can be rearranged, removed, and/or resized, and the contents of the fields varied. For example, the HE-SIG-C 920 can be omitted in some embodiments. Additionally or alternatively, there may be more than one HE-LTF 914 or HE-ELTF 918.

In accordance with the embodiments described above, HE-SIG-A 908 or HE-SIG-B 910 may include an indication that the packet comprising header frame 900 is a sounding PPDU, and that HE-ELTFs 918 are present. In one embodiment, HE-SIG-C 920 may also comprise information necessary to facilitate the transmission of a request for sounding information (e.g., CSI) from wireless STAs. In some aspects, HE-SIG-A 908 or HE-SIG-B 910 may include an indication of how many HE-LTFs 914 and HE-ELTFs 918 are present. HE-ELTF may be referred to as an HE extended LTF. Additionally or alternatively, HE-LTF 914 and HE-ELTF 918 may be used by STAs to calculate CSI requested by an AP 110. In some embodiments, HE-Data may be sent in 1 symbol (SS) rates so that all intended recipients can hear the data (e.g., an NDPA MAC) reliably. In this embodiment, HE-LTF 914 may be 1SS, and may be used for HE-Data demodulation. If the channel from more than one antenna needs to be estimated (e.g., in accordance with a MIMO protocol), then HE-ELTFs 918 are used to determine the requested CSI.

Figure 10:
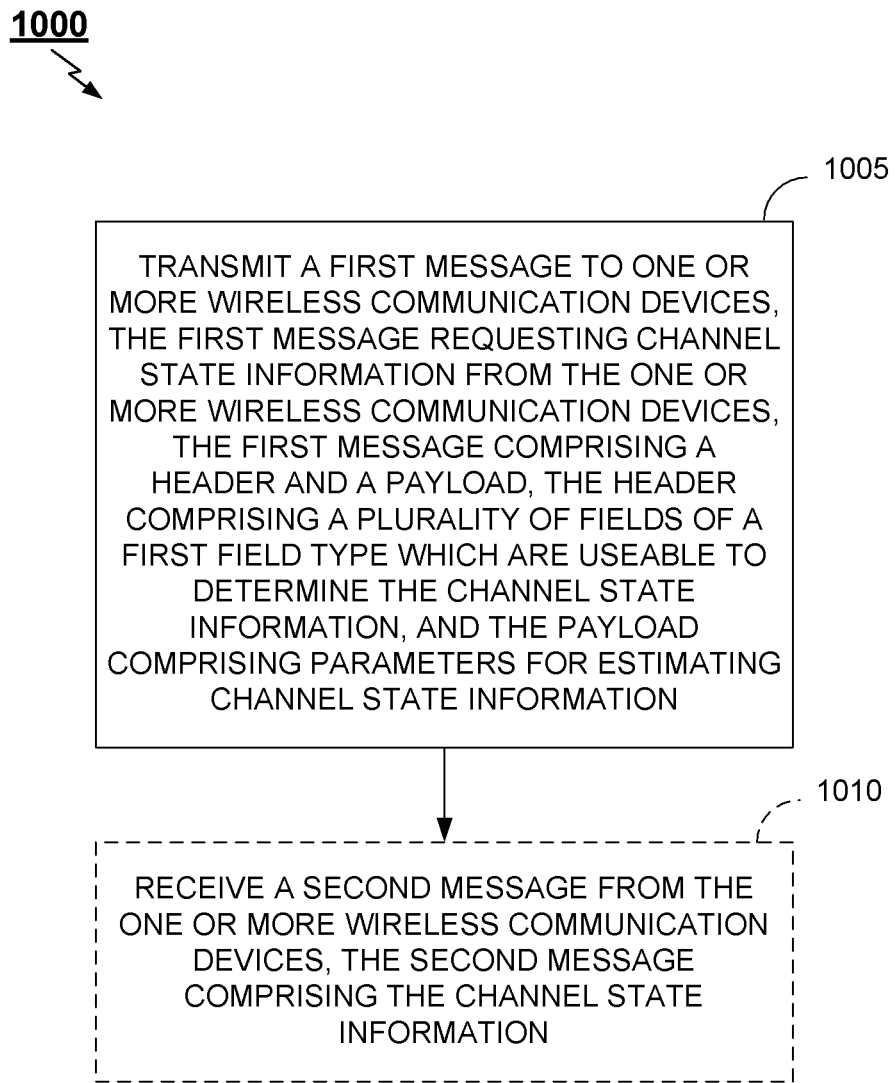
FIG. 10 is a flow chart of an aspect of an exemplary method of wireless communication.

FIG. 10 is a flow chart of an exemplary method 1000 for wireless communication in accordance with certain embodiments described herein. In some embodiments method 1000 may be performed by an apparatus for wireless communication, such as the AP 110 of FIG. 1 or the wireless communication device 302 of FIG. 3. However, a person having ordinary skill in the art will appreciate that the method 1000 may be implemented by other suitable devices and systems.

At operation block 1005, the wireless communication device 302, for example, transmits a first message to one or more wireless communication devices, requesting channel state information from the one or more wireless communication devices. As illustrated, the first message comprises a header and a payload, the header comprising a plurality of fields of a first field type which are useable to determine the channel state information, and the payload including parameters for determining channel state information. In various aspects, the payload further comprises identifiers of the one or more wireless communication devices. In another aspect, the header further comprises identifiers of the one or more wireless communication devices. In some aspects, the payload of the first message comprises a high-efficiency (HE) control field comprising the parameters for estimating the channel state information. In some aspects, first field type comprises long training fields (LTFs) which are used by STAs to determine the requested channel state information. In some aspects, the header further comprises a field of a second field type comprising one or more bits indicating a presence or number of the plurality fields of the first field type in the header. In one aspect, the second field type is either a high-efficiency SIG-A field, or a high-efficiency SIG-B field, or even a high-efficiency SIG-C field.

In various aspects, the first message (e.g., the payload) comprises a sounding physical layer convergence protocol data unit (PPDU), and the sounding PPDU comprises a null data packet announcement (NDPA) medium access control (MAC) frame. In some aspects, the payload comprises an aggregated medium access control protocol data unit (A-MPDU). In some aspects, an MPDU of the A-MPDU comprises a null data packet announcement (NDPA) and the header of the first message further comprises an indication that a group of wireless communication devices with a first set of capabilities are to decode the A-MPDU, at least until the NDPA is decoded.

In various aspects, the payload of the first message is transmitted on two or more tones or sub-bands and further comprises tone or sub-band allocation information identifying the one or more wireless communication devices. In some aspects, the first message further comprises an indication of a tone or sub-band for which the channel state information is requested. As a non-limiting example, requesting CSI of a sub-band rather than an entire bandwidth may provide more accurate estimation of the CSI. In some aspects, at least a portion of the first message (e.g., the payload) is transmitted on the tone or sub-band for which the channel state information is requested. In certain aspects, the tone or sub-band for which the channel state information is requested is specifically identified in the first message. In an embodiment, the tone or sub-band for which the channel state information is requested is the same as the tone or sub-band allocated to each of the one or more wireless communication devices, respectively.

In some aspects, the first message (e.g., the payload) may further comprise data for the one or more wireless communication devices, or management information intended for the one or more wireless communication devices. As a non-limiting example, this format may enable an AP and multiple STAs to cut down on the overall time required to send data/ACKs and CSI requests/responses between the entities.

At operational block 1010, the wireless communication device 302, for example, receives a second message is received from the one or more wireless communication devices. As illustrated, the second message comprises the requested channel state information. In some aspects, the channel state information is received simultaneously from at least two of the one or more wireless communication devices on two or more tones or sub-bands. In various aspects, the channel state information is received in an uplink multi-user physical layer convergence protocol data unit (MU-PPDU). In an embodiment, the MU-PPDU may be a UL-MU-MIMO or UL-OFDMA transmission. As a non-limiting example, simultaneously transmitting multi-user CSI information on multiple tones or sub-bands may save on the overall transmission time required for all STAs to provide CSI to an AP. In some aspects, the UL transmission may further comprise block acknowledgment of information previously transmitted to the one or more wireless communication devices. In some aspects, operational block 1010 is not part of method 1000.

In some embodiments an apparatus performing the method 1000, or a similar method, comprises various means for generating the messages or frames described herein, and various means for transmitting the messages or frames. In some aspects, the apparatus may further comprise one or more of various means for receiving, means for estimating, or means for allocating. In various embodiments, the various means for generating, means for estimating, or means for allocating may comprise one or more of the controller 230, the TX data processor 210, the data source 208, the data sink 244, the memory 232, the scheduler 234, the channel estimator 228, the TX spatial processor 220, the RX spatial processor 240, or the receiver/transmitter units 222a-ap of FIG. 2, the processor 304, the memory 306, the DSP 320, or the bus system 322 of FIG. 3, or equivalents thereof. In various embodiments, the various means for transmitting may comprise one or more of the controller 230, the data sink 244, the TX data processor 210, the data source 208, the memory 232, the scheduler 234, the TX spatial processor 220, the receiver/transmitter units 222a-ap, or the antennas 224a-ap of FIG. 2, the processor 304, the memory 306, the DSP 320, the bus system 322, the transmitter 310, the transceiver 314, or the antenna 316 of FIG. 3, or equivalents thereof. In various embodiments, the various means for receiving may comprise one or more of the controller 230, the data sink 244, the RX data processor 242, the data source 208, the memory 232, the scheduler 234, the RX spatial processor 240, the receiver/transmitter units 222a-ap, or the antennas 224a-ap of FIG. 2, the processor 304, the memory 306, the DSP 320, the bus system 322, the receiver 312, the transceiver 314, or the antenna 316 of FIG. 3, or equivalents thereof.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

As used herein, a phrase referring to "at least one of" a list of items refers to any combination of those items, including single members. As an example, "at least one of A, B or C" is intended to cover A or B or C or A and B or A and C or B and C or A, B and C or 2A or 2B or 2C and so on.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term interface may refer to hardware or software configured to connect two or more devices together. For example, an interface may be a part of a processor or a bus and may be configured to allow communication of information or data between the devices. The interface may be integrated into a chip or other device. For example, in some aspects, an interface may comprise a receiver configured to receive information or communications from a device at another device. The interface (e.g., of a processor or a bus) may receive information or data processed by a front end or another device or may process information received. In some aspects, an interface may comprise a transmitter configured to transmit or communicate information or data to another device. Thus, the interface may transmit information or data or may prepare information or data for outputting for transmission (e.g., via a bus).

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method of communication in a wireless network, the method comprising:
   transmitting a first message to one or more wireless communication devices, the first message requesting channel state information from the one or more wireless communication devices, the first message comprising a header and a payload, the header comprising a plurality of fields of a first field type which are useable to determine the channel state information, and the payload comprising:
   a sounding announcement configured to identify intended recipients of the sounding announcement and identify parameters for channel state information transmission; and
   parameters for estimating the channel state information,
   wherein the header further comprises a field of a second field type, the field of the second field type comprising one or more bits indicating a presence or number of the plurality of fields of the first field type in the header, and wherein the first field type is a long training field (LTF) and the second field type is either a high-efficiency SIG-A field or a high-efficiency SIG-B field.

2. The method of claim 1, further comprising:
   receiving a second message from the one or more wireless communication devices, the second message comprising the channel state information.

3. The method of claim 2, wherein the channel state information is received simultaneously from at least two of the one or more wireless communication devices on two or more tones, spatial streams, or sub-bands.

4. The method of claim 1, wherein the payload further comprises identifiers of the one or more wireless communication devices.

5. The method of claim 1, wherein the header further comprises identifiers of the one or more wireless communication devices.

6. The method of claim 1, wherein the payload comprises a sounding physical layer convergence protocol data unit (PPDU), and wherein the sounding PPDU comprises a null data packet announcement (NDPA) medium access control (MAC) frame.

7. The method of claim 1, wherein the payload comprises an aggregated medium access control protocol data unit (A-MPDU), wherein an MPDU of the A-MPDU comprises a null data packet announcement (NDPA), and wherein the header further comprises an indication that a group of wireless communication devices with a first set of capabilities are to decode the A-MPDU, at least until the NDPA is decoded.

8. The method of claim 1, wherein the payload comprises a high-efficiency (HE) control field comprising the parameters for estimating the channel state information.

9. The method of claim 1, wherein the payload is transmitted on two or more tones or sub-bands, and wherein the payload further comprises tone or sub-band allocation information identifying the one or more wireless communication devices.

10. The method of claim 1, wherein the payload further comprises an indication of a tone or sub-band for which the channel state information is requested.

11. An apparatus for wireless communication in a wireless communication network, the apparatus comprising:
    a processor configured to generate a first message, the first message requesting channel state information from one or more wireless communication devices, the first message comprising a header and a payload, the header comprising a plurality of fields of a first field type which are useable to determine the channel state information, and the payload comprising:
    a sounding announcement configured to identify intended recipients of the sounding announcement and identify parameters for channel state information transmission; and
    parameters for estimating the channel state information;
    a transmitter configured to transmit the first message to the one or more wireless communication devices,
    wherein the header further comprises a field of a second field type, the field of the second field type comprising one or more bits indicating a presence or number of the plurality of fields of the first field type in the header, and wherein the first field type is a long training field (LTF) and the second field type is either a high-efficiency SIG-A field or a high-efficiency SIG-B field.

12. The apparatus of claim 11, further comprising:
    a receiver configured to receive a second message from the one or more wireless communication devices, the second message comprising the channel state information.

13. The apparatus of claim 12, wherein the channel state information is received simultaneously from at least two of the one or more wireless communication devices on two or more tones, spatial streams, or sub-bands.

14. The apparatus of claim 11, wherein the payload comprises a sounding physical layer convergence protocol data unit (PPDU), and wherein the sounding PPDU comprises a null data packet announcement (NDPA) medium access control (MAC) frame.

15. The apparatus of claim 11, wherein the payload comprises an aggregated medium access control protocol data unit (A-MPDU), wherein an MPDU of the A-MPDU comprises a null data packet announcement (NDPA), and wherein the header further comprises an indication that a group of wireless communication devices with a first set of capabilities are to decode the A-MPDU, at least until the NDPA is decoded.

16. An apparatus for wireless communication in a wireless communication network, the apparatus comprising:
means for generating a first message, the first message requesting channel state information from one or more wireless communication devices, the first message comprising a header and a payload, the header comprising a plurality of fields of a first field type which are useable to determine the channel state information, and the payload comprising:
a sounding announcement configured to identify intended recipients of the sounding announcement and identify parameters for channel state information transmission; and
parameters for estimating the channel state information;
means for transmitting the first message to the one or more wireless communication devices,
wherein the header further comprises a field of a second field type, the field of the second field type comprising one or more bits indicating a presence or number of the plurality of fields of the first field type in the header, and wherein the first field type is a long training field (LTF) and the second field type is either a high-efficiency SIG-A field or a high-efficiency SIG-B field.

17. The apparatus of claim 16, further comprising:
means for receiving a second message from the one or more wireless communication devices, the second message comprising the channel state information.

18. The apparatus of claim 17, wherein the channel state information is received simultaneously from at least two of the one or more wireless communication devices on two or more tones, spatial streams, or sub-bands.

19. The apparatus of claim 16, wherein the payload comprises a sounding physical layer convergence protocol data unit (PPDU), and wherein the sounding PPDU comprises a null data packet announcement (NDPA) medium access control (MAC) frame.

20. The apparatus of claim 16, wherein the payload comprises an aggregated medium access control protocol data unit (A-MPDU), wherein an MPDU of the A-MPDU comprises a null data packet announcement (NDPA), and wherein the header further comprises an indication that a group of wireless communication devices with a first set of capabilities are to decode the A-MPDU, at least until the NDPA is decoded.

21. A non-transitory computer readable medium having stored thereon, instructions that, when executed, cause a processor of an apparatus to:
transmit a first message to one or more wireless communication devices, the first message requesting channel state information from the one or more wireless communication devices, the first message comprising a header and a payload, the header comprising a plurality of fields of a first field type which are useable to determine the channel state information, and the payload comprising:
a sounding announcement configured to identify intended recipients of the sounding announcement and identify parameters for channel state information transmission; and
parameters for estimating the channel state information,
wherein the header further comprises a field of a second field type, the field of the second field type comprising one or more bits indicating a presence or number of the plurality of fields of the first field type in the header, and wherein the first field type is a long training field (LTF) and the second field type is either a high-efficiency SIG-A field or a high-efficiency SIG-B field.

22. The computer readable medium of claim 21, wherein the instructions, when executed, also cause a processor of the apparatus to:
receive a second message from the one or more wireless communication devices, the second message comprising the channel state information.

23. The non-transitory computer readable medium of claim 22, wherein the channel state information is received simultaneously from at least two of the one or more wireless communication devices on two or more tones, spatial streams, or sub-bands.

24. The non-transitory computer readable medium of claim 21, wherein the payload comprises a sounding physical layer convergence protocol data unit (PPDU), and wherein the sounding PPDU comprises a null data packet announcement (NDPA) medium access control (MAC) frame.

25. The non-transitory computer readable medium of claim 21, wherein the payload comprises an aggregated medium access control protocol data unit (A-MPDU), wherein an MPDU of the A-MPDU comprises a null data packet announcement (NDPA), and wherein the header further comprises an indication that a group of wireless communication devices with a first set of capabilities are to decode the A-MPDU, at least until the NDPA is decoded.

* * * * *